United States Patent [19]

Futaba et al.

[11] Patent Number: 4,796,715
[45] Date of Patent: Jan. 10, 1989

[54] HYDRAULIC PRESSURE REACTION DEVICE IN A POWER STEERING DEVICE

[75] Inventors: Takeshi Futaba; Masahiko Noguchi, both of Yao, Japan

[73] Assignee: Koyo Jidoki Kabushiki Kaisha, Nara, Japan

[21] Appl. No.: 932,734
[22] PCT Filed: Feb. 28, 1986
[86] PCT No.: PCT/JP86/00105
  § 371 Date: Oct. 27, 1986
  § 102(e) Date: Oct. 27, 1986
[87] PCT Pub. No.: WO86/05152
  PCT Pub. Date: Sep. 12, 1986

[30] Foreign Application Priority Data

Mar. 1, 1985 [JP] Japan ................... 60-41499
Mar. 18, 1985 [JP] Japan ................... 60-52442

[51] Int. Cl.⁴ ............... B62D 6/02; B62D 5/04; B62D 5/00
[52] U.S. Cl. ..................... 180/143; 91/375 A; 180/132
[58] Field of Search ............... 180/132, 141, 142, 143; 60/384, 385, 363 R; 91/375 A, 459, 467

[56] References Cited

U.S. PATENT DOCUMENTS

| | | | |
|---|---|---|---|
| 3,998,131 | 12/1976 | Adams | 91/375 A |
| 4,034,825 | 7/1977 | Adams | 180/143 |
| 4,535,678 | 8/1985 | Thomsen et al. | 180/132 |
| 4,557,342 | 12/1985 | Drutchas | 180/132 |
| 4,560,023 | 12/1985 | Kirby | 180/132 |
| 4,601,358 | 7/1986 | Kozuka et al. | 180/141 |
| 4,621,704 | 11/1986 | Kozuka | 180/143 |

FOREIGN PATENT DOCUMENTS

| | | |
|---|---|---|
| 71031 | 6/1975 | Japan . |
| 162337 | 12/1979 | Japan . |
| 114159 | 7/1984 | Japan . |
| 230863 | 12/1984 | Japan . |

Primary Examiner—Richard A. Bertsch
Attorney, Agent, or Firm—Bruce L. Adams; Van C. Wilks

[57] ABSTRACT

A speed sensitive hydraulic pressure reaction device in a rack pinion type power steering device of the type employing a rotary valve. A valve body of the output shaft and the rotary valve forms a sleeve portion so as to integrally rotate around the input shaft. The sleeve portion has a plurality of holes mutually communicating through a ring ditch, and a plunger is slidably disposed in each hole. The input shaft has a plurality of slots which engage with the respective plungers at the outer periphery of the input shaft. Each slot has a bottom and a pair of slant surfaces in a cross section orthogonal to the input shaft. When the center of the plunger is aligned with a center between the pair of slant surfaces, gaps are formed between the plunger and each of the slant surfaces.

16 Claims, 8 Drawing Sheets

HYDRAULIC PRESSURE REACTION DEVICE IN A POWER STEERING DEVICE

FIELD OF THE INVENTION

This invention relates to a power assist steering device (hereinafter simply "power steering device") and more particularly to a hydraulic reaction pressure device in the power steering device wherein pressurized oil from a pump driven by the engine is controlled by a vehicle speed. This pressurized oil is supplied to a hydraulic reaction pressure chamber so that a resistance at steering time is changed in response to the vehicle speed. This invention relates more particularly to the hydraulic reaction pressure device having a centering function to coincide a valve neutral position with a neutral position of the reaction pressure device (a position where the hydraulic reaction does not functions with respect to the relative displacement of the valve).

DESCRIPTION OF THE PRIOR ART

In the rotary valve employed in hydraulic power assisting device for the power steering system, the neutral positions of the output and input shafts of the valve are, as shown in FIGS. 3 and 4, preferably axis X—X of a plurality of, for example, eight number of ditches 51 provided on a valve body 51 of the output shaft and axis Y—Y of a convex 52B of a plurality, for example eight number of ditches 52A. In other words, two gaps a and a' formed between the projections 51B of each ditch 51A of the valve body 51, and each convex 52B of the input shaft 52 are preferably a=a'. Although the condition a=a' at one ditch 51A is available, it is difficult to coincide the axe at all the other ditches in view of a mechanical finishing accuracy, and an accumulated error of the valve body 51 and the input shaft 52 becomes deviated state as shown in FIG. 5. FIG. 5 is a graph showing an angular position $\theta$ of the ditch at an abscissa and the accumulated error e at a vertical axis, and showing the finishing accumulated error of each ditch 51A and 52A when the valve roates from K point to J point and further to K point.

FIGS. 1 and 2 show the hydraulic pressure reaction device of a conventional power steering device in cross section, but this hydraulic reaction pressure device is formed as V-shape ditch 60 in cross section othogonal to an outer periphery of the input shaft 52, and a plurarity of the reaction chambers 58 which extend radialy toward the V-ditchs 60 are formed in the valve body 51. Each reaction chamber 58 has a ball 59, which is pressedly pushed against the V-ditch by the pressurized oil. As apparent from the above description, in this conventional device, it is almost impossible to coincide the axe of all the reaction members to each axis of the valves in view of the mechanical finishing accuracy and an adjusting error at an assembly process. In a practical automobiles, when the valve body 51 of the output shaft and the input shaft 52 take respective positions neutral, a slight gap $\Delta l$ is created between a right hand slant surface of the V-ditch 60 and the ball 59 as shown in FIG. 7 with respect to the axe of the reaction member and the valve. This gap may be also created in a left hand slant surface instead of the V-ditch 60, but for the convenience of the explanation, the right hand slant surface is mentioned. When the ball 59 is affected by the pressurized oil with an accelleration of the vehicle speed, the ball 59 is pushed radially and inwardly, and this ball 59 rotates the input shaft 52 in the counter clockwise direction in a cam functional manner so as to take a condition shown in FIG. 6. Because a torsion rod 53 has an weak power to hold the condition shown in FIG. 7 for the input shaft 52, it is shifted by pushing power of the pressurized oil. As a result, the valve is relatively displaced. As shown in FIG. 8, where an input torque is indicated at an abscissa and the pressing power is indicated at a vertical line, the neutral position (the lowest circuit pressure) of the valve deviates to a right hand 0→0', and a pressure difference of P' is created at the original valve neutral position. This P' is generated as a pressure difference of left and right cylinders CYL1, and CYL2 (not shown) for hydraulic pressure assisting of the power steering device and it actuates the steering cylinders. In this example, it rotates the steering wheel in a counter clockwise direction, thereby creating unstable running. In other words, unless a driver keeps a handle for straight running, the steering wheel has a problem to create a performance to always run in a slant direction, due to the cam function at the V-ditch of hydraulic pressure reaction member.

Furthermore, as the hydraulic pressure reaction member is provided between the valve body 51 and the input shaft 52, the hydraulic power reaction directly affects a drive pin 55 which interconnects valve body 51 and a pinion 54 which is the output shaft, for this arrangement, the pin 55 is apt to be damaged and to wear, and this lowers the valve function which are drawbacks.

SUMMARY OF THE INVENTION

An object of this invention is to provide the hydraulic pressure reaction device in the power steering device which easily adjusts the neutral position of the oil pressure reaction power device and the power steering control neutral position of the valve with each other and to correctly prevent a risk of unstable running tendency at a linear running.

Another object of the invention is to provide the hydraulic reaction power device in the power steering device to prevent the valve flow malfunction such that the hydraulic press reaction does not affect the link portion of the pinion and the valve body.

BRIEF DESCRIPTION OF THE ACCOMPANYING DRAWING

DESCRIPTION OF THE PREFERRED EMBODIMENTS

Figure 9:
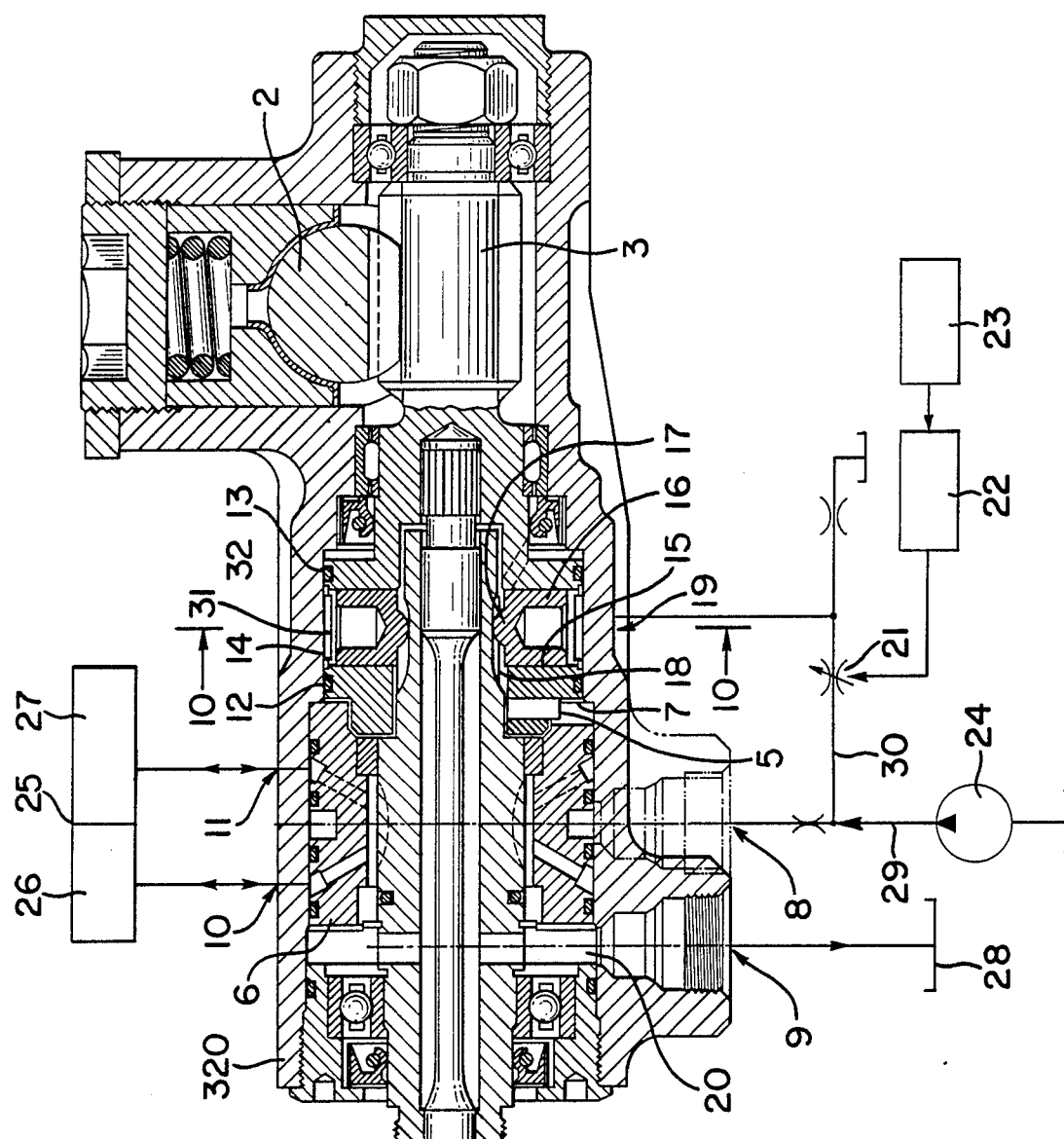
FIG. 9 is a cross section of the device according to this invention.
Figure 10:
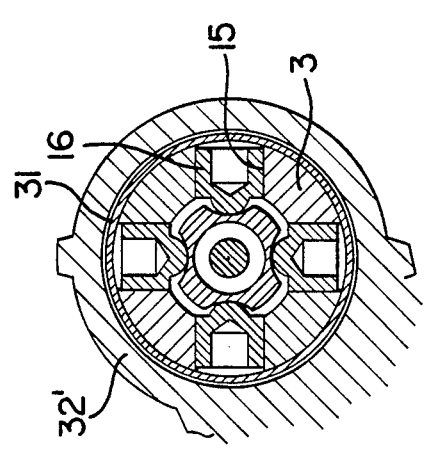
FIG. 10 is a cross section along a line 10—10 in FIG. 9.

Referring to FIG. 9, the power steering device includes an input shaft 1 and a pinion 3 intgrally connected to each other at ends thereof by a torsion rod 4 in a similar manner to the conventional device. The pinion 3 constitutes an output shaft which meshes with a rack 2, and a drive pin 5 is compressedly fixed at the end of this pinion 3. The pinion 3 is integrally fitted with a valve body 6 by engaging the drive pin 5 in a ditch 7 formed in the valve body 6. The valve body 6 surrounds the input shaft 1 and cooperates with the input shaft 1 thereby forming the known rotary valve. Torsional function of the torsion rod 4 creates a relative angular or rotational displacement between the input shaft 1 and the pinion 3, to actuate the rotary valve. Pressurized oil from a pump 24 which is driven by the rotaiton of the engine is supplied from an inlet port 8 to the rotary valve through an oil path 29, and the pressurized oil is selectively supplied to a right cylinder port 10 and a left cylinder port 11 thereby conducting the hydraulic press reaction assistance of the steering wheel.

Provided on an outer periphery of an axially extending sleeve portion of the pinion or output shaft 3 is a peripheral ditch, and provided in four places remote in an equal distance on the circumference of the peripheral ditch 32 are holes 15 which radially extend. In each hole, plungers 16 in a cylindrical shape having a bottom or end portion are slideably disposed. Inserted in the peripheral ditch 32 is an annular ring member 31, which restricts the linear displacement of the plunger 16 radially and outwardly. Between the outer perphery of the sleeve portion of the pinion shaft 3 and an inner wall of a housing 320, a hydraulic pressure chamber 14 is formed between a pair of separate seal rings 12 and 13 provided on both sides of the periphery ditch 32. Each plunger 16 is arranged to slide radially and inwardly in response to the pressurized oil from the oil chamber 14. A tip end portion of each plunger has a spherical head 17. Formed on the outer periphery of a cylindrical end portion of the input shaft 1 are a plurality of concave recesses or slots 18 which axially extend and correspond to the spherical head 17. A bottom surface 18a of the concave recess 18 is an arcuate surface of radius R from the valve center (See FIG. 11). Formed between each of side surfaces 18b and 18c which slants in the circumferentially opposite direction and the spherical head 17 are gaps or clearance S1 and S2 which correspond to a deviation which is considered in a sense of the mechanical finishing accuracy. Connected to the hydraulic oil chamber 14 is another oil path 30 branched from the oil path 29, but provided on this oil path 30 is an hydraulic pressure reaction valve 21, the opening rate of which is controlled, by an electronic control member 22 including solenoid which is connected to a vehicle speed sensor 23. By such a construction, the hydraulic oil chamber 14 is supplied through an inlet port 19 with the pressurized oil controlled by the vehicle speed.

Referring to again FIG. 9, when starting rightward steering operation, the pinion 3 is not easily rotated against the rotation of the input shaft 1, since the pinion 3 meshes with the rack 2 which does not move by exchanging resistance. For this fact, a torsional displacement is created on the torsion bar 4, and with it, a displacement is created between the input shaft 1 and the valve body 6, and the pressurized oil is supplied through the inlet port 8 and the cylinder port 10 to a right hand cylinder 26 of the power-assisting motor 25. Accordingly, the steering wheel is controlled under the oil pressure assist. While the oil of the left hand cylinder 27 of the power-assisting motor 25 is fed back from the left hand cylinder 27 through the cylinder port 11, a fed back path and the fed back port 9 to a tank 28.

While the vehicle is running, signals corresponding the vehicle speed is fed from the vehicle speed sensor 23 to the electronic controller 22, which controls the hydraulic pressure reaction control valve 21 to supply the pressurized oil in response to the vehicle speed to the plunger 16 in the hole 15. The plunger 16 is pushed radially and inwardly by the pressurized oil, and the spherical head 17 of the plunger 16 is pushed against the bottom 18a of the concave recess 18 of the input shaft 1.

Figure 12:
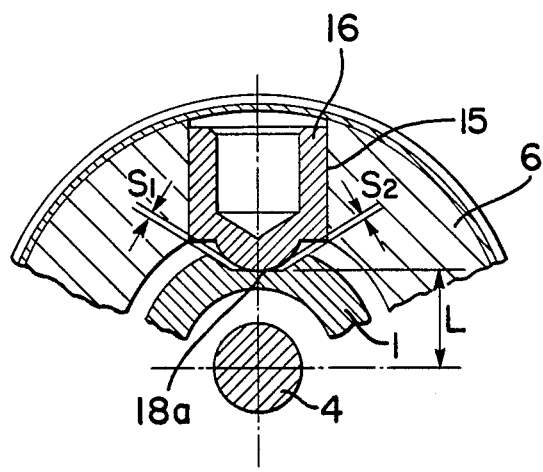

The function of the apparatus according to this invention will be explained at a state when the input shaft neutral position and the output shaft neutral position are deviated from each other in the rotational direction of the rotary valve during the straightforward running. When the pressurized oil is applied to the hydraulic oil or reaction power chamber 14, the valve body 6 integral with the pinion 3 is provided with a rotational displacement tolerance within the input shaft 1 through the gaps S1 and S2, and therefor there is no cam function or locking by the contact between the spherical head 17 and both of the side surfaces 18b and 18c of the concave recess 18. Accordingly, the relative displacement between the input and output shafts in the respective neutral positions are adjusted to null the same. Hence, as there is no pressure difference at the left and right cylinders 26 and 27, there is no risk of the unstable running tendency for the vehicle by a unmeasurable driving. Even when there is created a deviation between the input and output shaft neutral positions which causes the rotary valve to effect the power-assist steering, it is clear that the gaps S1 and S2 are effective to null the relative displacement of the input and output shafts. However, in such a case, it is preferable to consider furthermore the bottom surface shape of the concave recess 18 on the input shaft 1. Preferable bottom surface shape orthogonal to the axial direction of the input shaft 1 is an arcuate surface 18a concentrical to the cylindrical end portion of the input shaft 1, or a plane 18a including a tangential line of the arcuate surface as shown in FIG. 12 for easiness of machining and maintenance of finishing accuracy.

Figure 1:
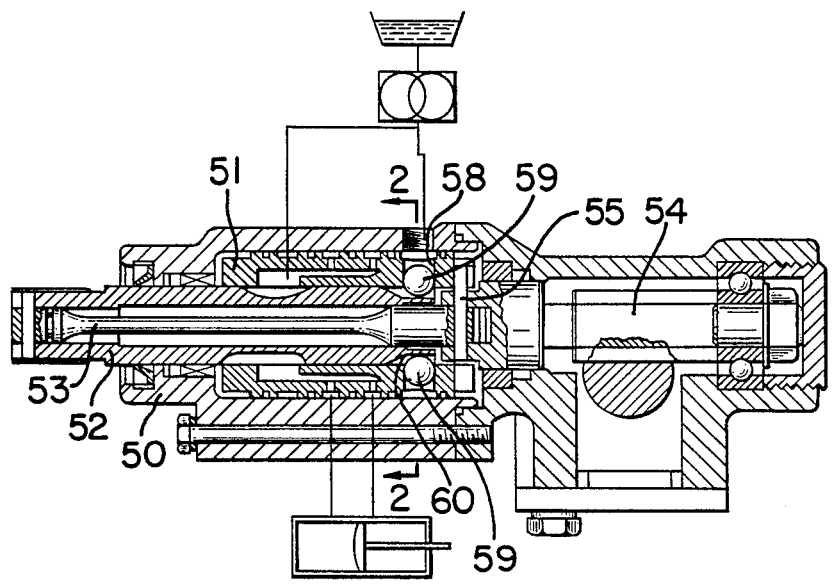
FIG. 1 is a cross section showing a conventional device.
Figure 2:
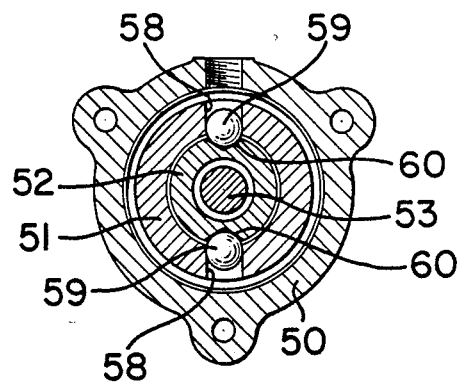
FIG. 2 is a cross section along a line 2—2 in FIG. 1.
Figure 3:
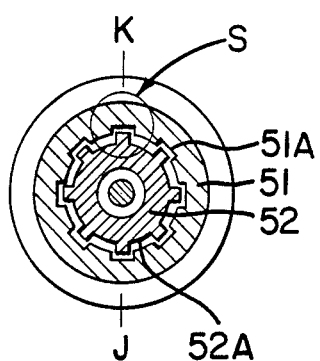
FIG. 3 is a cross section of the valve portion in the conventional device shown in FIG. 1.
Figure 4:
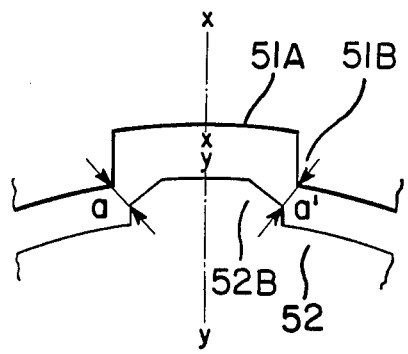
FIG. 4 is an enlarged view of a circular portion shown in FIG. 3.
Figure 5:
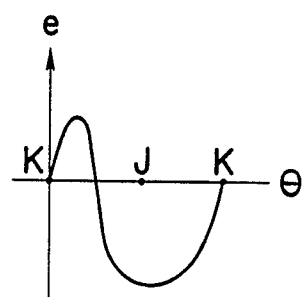
FIG. 5 is a dimensional graph explaining accumulated error in the valve shown in FIG. 3.
Figure 6:
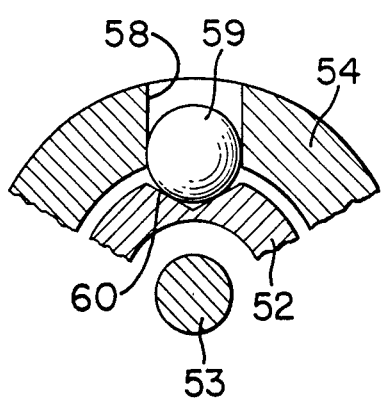
FIGS. 6 and 7 are views explaining function of the hydraulic reaction mechanism shown in FIG. 2, respectively.
Figure 8:
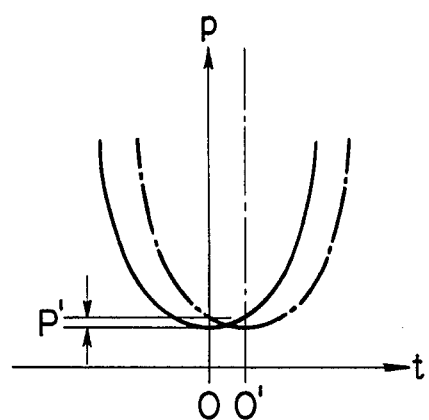
FIG. 8 is a graph explaining the relation between the input torque at the valve relative displacement and the affecting pressure to the cylinder in the conventional device.
Figure 7:
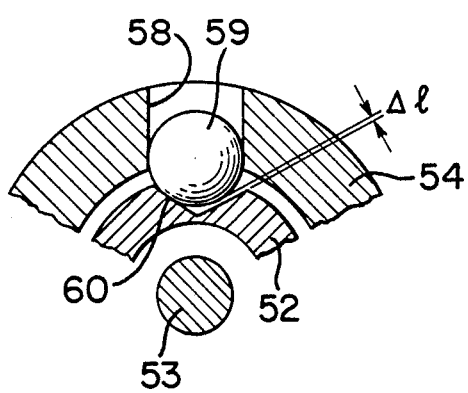
Figure 13:
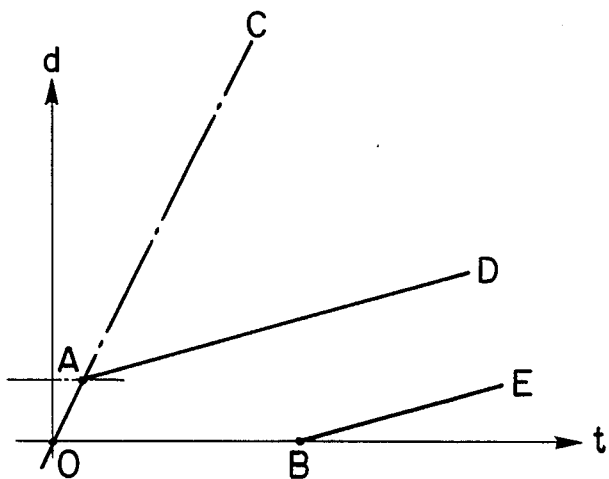
FIG. 13 is a graph comparing the conventional device and this invention with respect to a relative displacement of the valve against the input torque.
Figure 11:
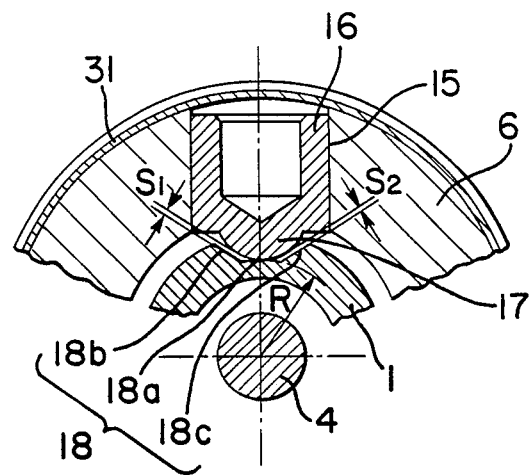
FIGS. 11 and 12 are corss sections showing different embodiments of the hydraulic press reaction mechanism portion shown in FIG. 10, respectively.

FIG. 13 is a graph for comparison of this invention and the conventional device, showing the input torque t on abscissa, and the relative displacement amount d between the input and output shafts, on the vertical line, $\overline{OC}$ is a normal power steering characteristics (torsion bar only), which indicates a relation of the relative displacement amount and the input torque, primarily proportional to the torsion of the torsion bar. $\overline{OBE}$ shows characteristics in the conventional device shown in FIGS. 1 and 2, and in this case, $\overline{OB}$ indicates a state where the relative displacement is locked by the hydraulic pressure reaction, and $\overline{BE}$ indicates a state where the relative displacement movement starts from a time when the input torque is larger than power of locking of the hydraulic pressure reaction. In contrast, the device of this invention shows chracteristics of $\overline{OAD}$. $\overline{OA}$ indicates a state where the hydraulic press reaction is not effected due to the gaps S1 and S2 as shown in FIG. 11, and $\overline{AD}$ indicates a state where the hyraulic press reaction functions from the time when the spherical head 17 simultaneously contacts the bottom face 18a and the side face 18c in the concave recess 18 of the input shaft 1.

Figure 14:
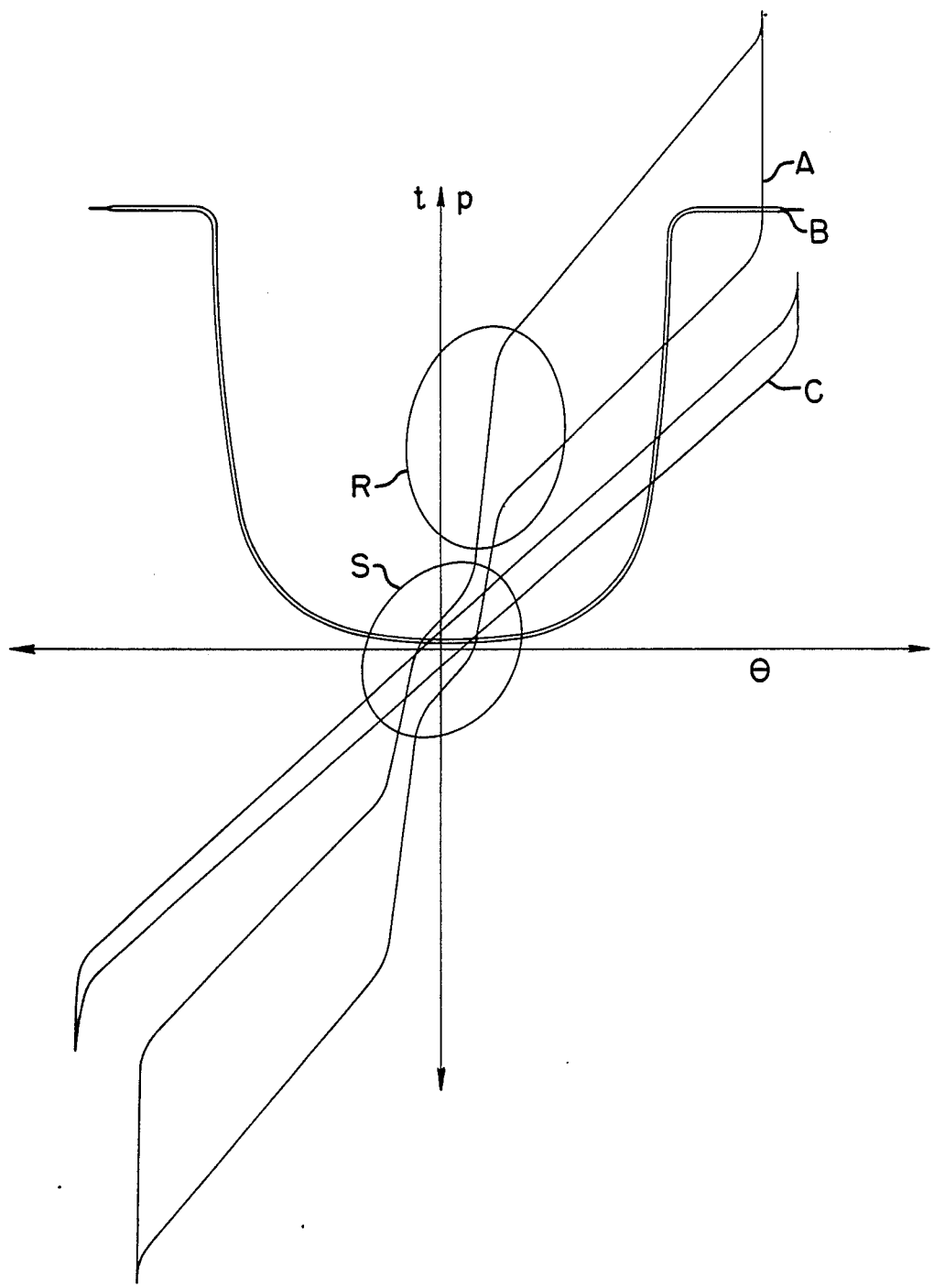
FIG. 14 is a graph showing a relation of an input shaft distortional angle and the input torque.

FIG. 14 shows a graph which typically represents features of the device of this invention In this graph, the abscissa shows an input shaft torsional angle $\theta$, vertical axis shows an input torque t and oil pressure P. The neutral position of the input shaft and the neutral position of the output shaft almost coincide with each other, and it clearly shows a range where the hydraulic press reaction does not function. In other words, a curve C shows a relation between the torsional angle and the input torque when the torsion bar is only actuated. A curve B shows the relation between the input shaft angle and the oil pressure and both are symmetrical. A curve A shows the relation between the torsion rod torsional angle and the input torque when the hydraulic reaction pressure (20 Kg/cm$^2$) is applied and the slant portion S about the valve neutral position is similar to the slant portion C of the torsion rod (because the slants of R member when the hydraulic prssure reactance does not function and S member when the hydraulic pressure reactance does not function are different from each other). Namely, the hydraulic pressure reaction is not effective even when the reaction pressure is applied to the hydraulic oil chamber about the valve neutral position.

Figure 15:
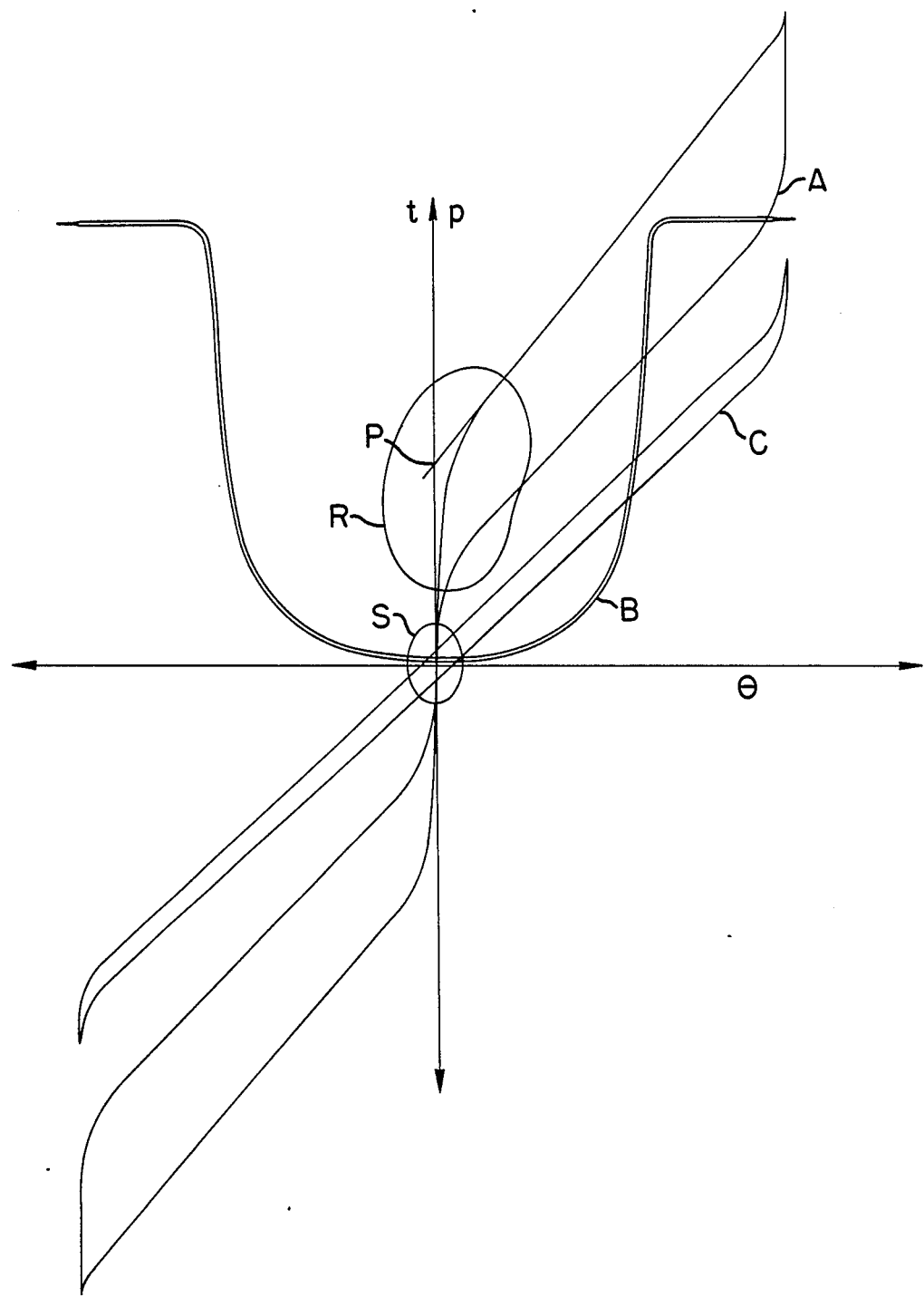
FIG. 15 is a graph similar to FIG. 14 in another embodiment according to this invention showing slightly different charateristics.

FIG. 15 is similar to FIG. 14, but when the range where hydraulic pressure reaction does not function is extremely small, the neutral position of the valve and the neutral position of the hydraulic pressure reaction almost coincide with each other. Slants in the torsion bar characteristics C and S are extremely different from each other. However, characteristic showing the relation between the torsion rod torsional angle and the input torque is not characteristic to pass the P point at the R point where the hydraulic press reaction functions. This fact shows that this is not shown to be a lock of the valve (characteristic) of the valve of the conventional device. Torsion rod 4 is always provided with the resilient torsional effect for gaps S1, S2, whereby the valve is kept at a state where the hydraulic pressure auxiliary works. Hence, the reaction smoothly works from the straight running time to the steering time, whereby there is no abrupt change of a shock of the handle manipulation.

As the hydraulic pressure reaction member is provided between the pinion sleeve head and the input shaft, and the hydraulic pressure reaction does not affect the pinion and the valve body, the drive pin does not apt to break and wear, so that lowering of the valve function is prevented.

Figure 16:
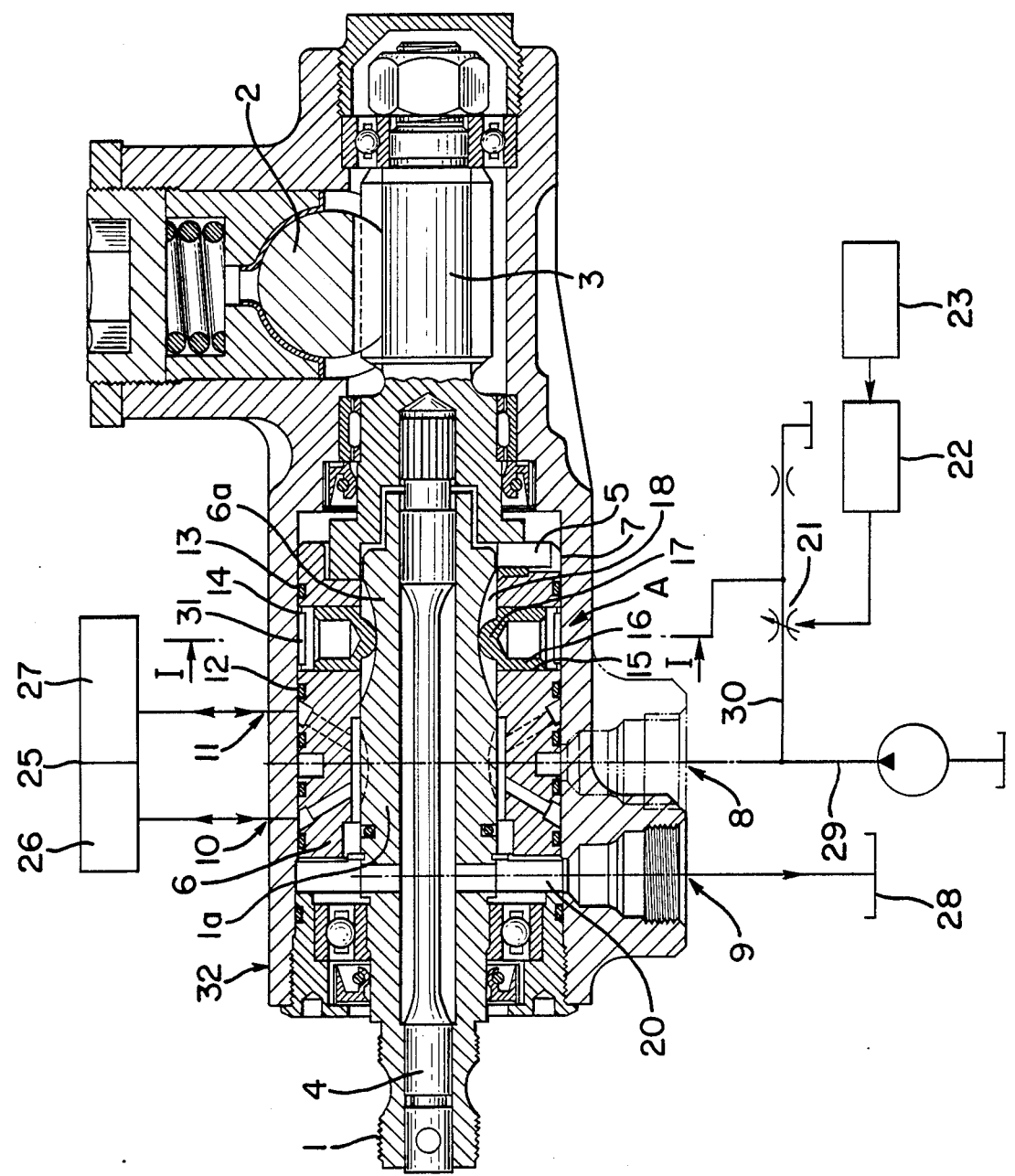
FIG. 16 is a view similar to FIG. 1 showing another embodiment of this invention.

Referring to FIG. 16, although this embodiment is substantially the same as the embodiment in FIG. 9, a slight different feature in its construction is shown. In comparison with FIG. 9 for discussion, in this embodiment, diffences are that the valve body 6 extends longitudinally in the axial direction, and at the extended end portion 6, the valve body 6 is engaged with the pinion 3 by the pin 5, and a plurality of holes 15 constituting the hydraulic pressure reaction mechanism are provided in the extended portion and a plunger 16 is mounted in each hole 15. However, all the constitution relative to the hydraulic pressure reaction mechanism is similar to the one shown in FIG. 9 and hence the like reference numerals have like meaning.

Although we discussed about several embodiments, these are the limited examples and these are not to restrict the scope of the claim. Particularly about the shapes of the plunger of the hydraulic pressure reaction mechanism may be spheric instead of the cylinder having the bottom. In the embodiment in FIG. 9, the pressurized oil from the main pump 24 driven by the engine is led into the hydraulic oil chamber 14 through the second oil path 30 branched from the first oil path 29. Instead an auxiliary pump as well as the main pump 24 can be provided so that the pressurized oil from the auxiliary pump is functionally lead into the hydraulic oil chamber 14 through a conducting chamber. In this case, the main pump 24 and the auxiliary pump may be independently made in the form of so-called tandem pumps which are installed in one pump case. Along this modified embodiments, the pressurized oil led into the hydraulic reaction oil chamber 14 is not influenced by the pressure generated in the first oil path 29, and is controlled irrelevantly with the pressure, and hence the mechanism of the hydraulic pressure reaction control valve 21 and the electronic control 22 can be simplified.

We claim:

1. A hydraulic pressure reaction device for a steering system to assist a steering mechanism for a vehicle by a hydraulic pressure power device, comprising: an input shaft remotely interconnected to a steering handle; an output shaft having a pinion which engages with a rack; a torsion rod for relatively and torsionally interconnecting said input shaft and output shaft to each other; valve bodies constituting a rotary valve means which surrounds said input shaft and cooperates with said input shaft; and interconnecting means which functionally interconnects said output shaft and valve bodies for rotating said valve bodies together with said output shaft to constitute a single rotary assembly; said rotary valve means being actuated based on an angular directional deviation between the input shaft and said valve bodies created by relative torsional displacement between said input shaft and output shaft, said hydraulic pressure power device being controlled by said rotary valve means, said rotary assembly including a sleeve portion which surrounds said input shaft, said sleeve portion having a plurality of holes radially passing therethrough and being mutually connected to each other by annular ditches, said rotary assembly including plunger members mounted in said respective holes, said input shaft having a plurality of slots which engage with said respective plunger members on an outer periphery of the input shaft, said each plunger being supplied with hydraulic pressure corresponding to a speed of said vehicle and being forcibly contacted with each of said slots to operate said hydraulic pressure reaction device, said slots extending in an axial direction of said input shaft and having a bottom and a pair of slant surfaces which slant in circumferentially opposite directions of the input shaft to create gaps between said plunger and each slant surface when a center of each plunger circumferentially coincides with a center between the pair of slant surfaces of the corresponding slot.

2. A hydraulic pressure reaction device according to claim 1; wherein the bottom surface of each slot has an arc which is concentrical with said input shaft.

3. A hydraulic pressure reaction device according to claim 1; wherein the bottom surface of each slot contains a tangential line relative to said input shaft.

4. A hydraulic pressure reaction device according to claim 1; wherein each plunger has a spherical end portion which engages with the corresponding slot.

5. A hydraulic pressure reaction device according to claim 4; wherein said plunger comprises a cylinder having a bottom outer spherical surface.

6. A hydraulic pressure reaction device according to claim 1; wherein said sleeve portion is formed as an extended portion of said valve bodies.

7. A hydraulic pressure reaction device according to claim 1; wherein said sleeve portion is formed as an extended portion of said output shaft.

8. In a power steering apparatus of a vehicle including an input shaft manually rotatable around its neutral position and having an axially forwardly extending cylindrical portion, and an output shaft rotatable around its neutral position and having an axially rearwardly extending sleeve portion for receiving therein the input shaft cylindrical portion, the output shaft being torsionally rotatably connected to the input shaft for effecting power-assisted steering of the vehicle in response to the relative rotational displacement between the input and output shafts: a plunger slideably disposed in a radial opening in the output shaft sleeve portion and actuatable to undergo linear displacement in the radial opening in the radial direction relative to the input shaft cylindrical portion, the plunger having a radially inward end portion; actuating means operative in response to the vehicle travelling speed for actuating the plunger in the radially inward direction to cause the plunger end portion to frictionally contact the periphery of the input shaft cylindrical portion to thereby frictionally restrict the relative torsional and rotational displacement between the input and output shafts; and means defining on the periphery of the input shaft cylindrical portion a recess for receiving therein the plunger end portion during the actuation of the plunger when the input and output shafts are aligned in their respective neutral positions, the recess being dimensioned to provide therein a clearance for the received plunger end portion in the circumferential direction of the input shaft cylindrical portion to thereby allow the input shaft to adjustably rotate through the clearance around its neutral position relative to the output shaft during the actuation of the plunger so as to null the relative rotational displacement between the input and output shafts.

9. A power steering apparatus according to claim 8; wherein the plunger end portion has a spherical surface for making frictional contact with the periphery of the input shaft cylindrical portion.

10. A power steering apparatus according to claim 8; wherein the means defining the recess includes a bottom surface formed within the periphery of input shaft cylindrical portion for receiving therein the plunger end portion, and a pair of spaced side surfaces defining therebetween the bottom surface and slanting away from the bottom surface in circumferentially opposite directions to provide the clearance for the received plunger end portion in circumferentially opposite directions.

11. A power steering apparatus according to claim 10; wherein the bottom surface comprises a cylindrical surface concentric with the periphery of the input shaft cylindrical portion.

12. A power steering apparatus according to claim 10; wherein the bottom surface comprises a flat surface.

13. A power steering apparatus according to claim 8; including a plurality of plungers circumferentially equidistantly disposed through the output shaft sleeve portion, and means defining on the periphery of the input shaft cylindrical portion a plurality of recesses for receiving respective ones of the plungers.

14. A power steering apparatus according to claim 8; wherein the plunger comprises a cylinder having radially outward and inward end portions.

15. A power steering apparatus according to claim 14; wherein the actuating means comprises means for applying hydraulic pressure proportional to the vehicle travelling speed to the radially outward end portion of the cylinder to actuate the cylinder in the radially inward direction.

16. A power steering apparatus according to claim 8; including valve means provided between the output shaft sleeve portion and the input shaft cylindrical portion and operative in response to the relative rotational displacement therebetween to regulate a hydraulic pressure for controlling the power-assisted steering of the vehicle.

* * * * *